United States Patent [19]

You

[11] Patent Number: 4,555,115

[45] Date of Patent: Nov. 26, 1985

[54] GOLF CLUB HEAD CONSTRUCTION

[76] Inventor: Chin-San You, No. 3, La. 1029, Fong-Shih Rd., Fong Yuan City, Taiwan

[21] Appl. No.: 618,028

[22] Filed: Jun. 7, 1984

[51] Int. Cl.⁴ .................. A63B 53/04; B32B 3/30
[52] U.S. Cl. ................................ 273/167 R; 428/98
[58] Field of Search ............ 273/167 R, 167 D, 77 R, 273/78; 428/106, 167, 161, 163, 184, 98; 403/381

[56] References Cited

U.S. PATENT DOCUMENTS

| | | | |
|---|---|---|---|
| 1,124,228 | 1/1915 | Houston | 403/381 |
| 3,455,558 | 7/1969 | Onions | 273/169 |
| 3,591,183 | 7/1971 | Ford | 273/167 |

Primary Examiner—John E. Kettle
Assistant Examiner—Thomas C. Saitta
Attorney, Agent, or Firm—Townsend and Townsend

[57] ABSTRACT

A composite construction of a golf club head including a plurality of laminated wooden layers and a plurality of resin impregnated fiber layers provided between said wooden layers characterized in that each of said wooden layers is provided with engagement surfaces for interengaging with other wooden layers. The engagement surfaces includes a plurality of tongue-and-groove surfaces in the direction perpendicular to the direction of the stroke.

5 Claims, 4 Drawing Figures

GOLF CLUB HEAD CONSTRUCTION

BACKGROUND OF THE INVENTION

This invention relates to the construction of a golf club, particularly to an improved construction of a composite golf club head.

Golf club heads have existed in various constructions. The early golf clubs were made of wood which was weak and not very tough, but still used because of their light weight. Such material is not suitable for use when driving the ball a long distance, since a large compression force, bending force and shear force are produced. To improve the strength of the golf club head, steel or stainless steel was used, but the club became very heavy. Further improvements have been attempted for the golf club construction by using a composite material. However, the composite material was found unsuitable because it became delaminated after use.

SUMMARY OF THE INVENTION

An object of the invention is to provide an improved construction of a golf club head having the light weight characteristic of wood and the toughness of steel. In addition, it possesses a characteristic suitable for driving long or short distances.

The foregoing and other objects can be achieved in accordance with the present invention through the provision of a composite construction of a golf club head which includes a plurality of laminated wooden layers and a plurality of resin impregnated fiber layers provided between said wooden layers and is characterized in that each of said wooden layers is provided with engagement surfaces for interengaging with the other wooden layers.

Advantageously, the engagement surfaces includes a plurality of spaced apart interlocking tongue-and-groove projections in the direction perpendicular to the direction of the strokes.

The presently preferred embodiment will be described in detail with reference to the accompanying drawings, in which:

DETAILED DESCRIPTION OF THE PREFERRED EMBODIMENT

Figure 3:
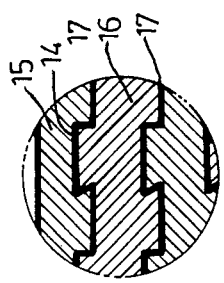
FIG. 3 is an enlarged view showing one form of the cross-section of the interlocking tongue-and-groove surfaces.

Referring to the drawings, there is shown a head portion 11 and a throat 12 constructed of a laminated wooden structure. Each of the wooden layers is provided with engagement surfaces for interengaging with the surfaces of other wooden layers. The interengaging surfaces includes a plurality of spaced apart tongue-and-groove surfaces 14 extending from one end of the head 11 to one end of the throat 12 in the direction perpendicular to the direction of the stroke provided on the inner surfaces of the outer layers 15 and on two surfaces of interposed layers 16.

Figure 4:
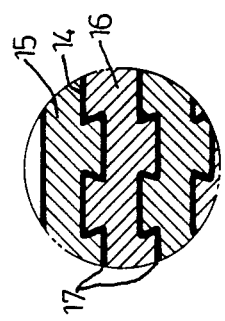
FIG. 4 is an enlarged view showing another form of the cross-section of the interlocking tongue-and-groove surfaces.
Figure 1:
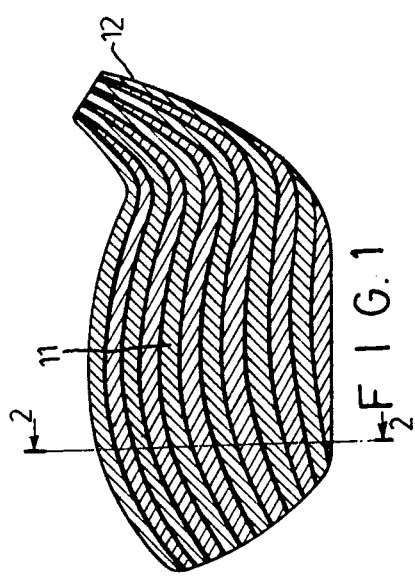
FIG. 1 is a schematic sectional view of a golf club head constructed according to the present invention.
Figure 2:
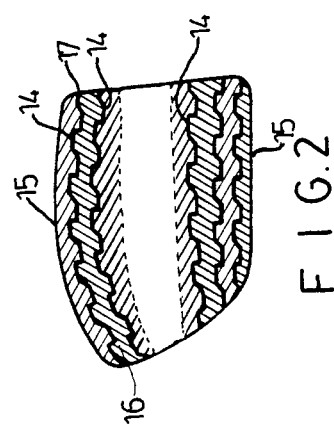
FIG. 2 is a sectional view taken along the line A-A' of FIG. 1.

Each tongue-and-groove surface 14 has a trapezoid shape in its cross-section which gradually decreases in its width to the deeper portion like the form as shown in FIG. 3 or 4, thereby rendering the wooden layers 15 and 16 to firmly interengage each other.

Between each two wooden layers are further provided resin impregnated fiber layer 17 which is adhesively bonded to the wooden layers. The composite structure is formed by molding tiers of wood and resin impregnated fiber in a compression mold with heat. The formed structure has the light weight characteristic of wood and the toughness of metal. in addition, the lamination is more durable than the conventional lamination because of the presence of interengaging surfaces.

With the invention thus explained, it is apparent that obvious modifications and variations can be made without departing from the scope of the invention. It is therefore intended that the invention be limited only as indicated in the appended claims.

I claim:

1. A golf club head comprising a body and a throat adapted for connection to a shaft, the body and the throat being of unitary construction and the body defining a strike face for the head, the body and the throat being constructed of a plurality of wooden laminations and a plurality of resin impregnated fiber layers disposed between the wood laminations and securing the wood laminations to each other, opposing surfaces of adjoining wood laminations defining a plurality of interlocking tongues-and-grooves extending generally in the direction substantially parallel to the strike face and distributed across the opposing wood lamination surfaces from an edge of the laminations proximate the strike face to another edge of the laminations.

2. A golf club head according to claim 1 wherein the interlocking tongues-and-grooves have a generally trapezoidal cross-section.

3. A composite construction of a golf club head including a plurality of laminated wooden layers and a plurality of resin impregnated fiber layers provided between said wooden layers wherein each of said wooden layers is provided with an engagement surface including means for establishing a mechanical interlocking engagement with another wooden layer.

4. A composite construction as claimed in claim 3, wherein the means of said engagement surfaces includes a plurality of spaced apart tongue-and-groove surfaces extending in the direction substantially parallel to the strike face.

5. A composite construction as claimed in claim 4, wherein said tongue-and-groove surfaces are trapezoidal in cross-section.

* * * * *